United States Patent [19]

Schmehr

[11] Patent Number: 4,819,854
[45] Date of Patent: Apr. 11, 1989

[54] SEAL FOR BEARINGS AND SYSTEM FOR SEALING BEARINGS

[75] Inventor: Peter Schmehr, Bubingen, Fed. Rep. of Germany

[73] Assignee: SKF GmbH, Schweinfurt, Fed. Rep. of Germany

[21] Appl. No.: 937,561

[22] Filed: Dec. 3, 1986

[30] Foreign Application Priority Data

Dec. 4, 1985 [DE] Fed. Rep. of Germany ... 8534101[U]

[51] Int. Cl.$^4$ ............................................... F16J 15/24
[52] U.S. Cl. ........................................ 277/47; 277/50; 251/315
[58] Field of Search ............................ 277/35, 44–51; 251/315; 285/110, 111, 379

[56] References Cited

U.S. PATENT DOCUMENTS

| 1,950,724 | 3/1934 | Fitzgerald | 277/48 |
| 3,522,930 | 8/1970 | Richards et al. | 251/315 |
| 3,554,484 | 1/1971 | Gachot | 251/315 X |

FOREIGN PATENT DOCUMENTS

| 1283624 | 11/1968 | Fed. Rep. of Germany | 251/315 |
| 775580 | 10/1934 | France | 277/47 |
| 978288 | 11/1950 | France | |
| 400018 | 10/1933 | United Kingdom | 277/47 |
| 452201 | 8/1936 | United Kingdom | 277/47 |
| 473663 | 10/1937 | United Kingdom | 277/47 |

Primary Examiner—Robert S. Ward
Attorney, Agent, or Firm—Eugene E. Renz, Jr.

[57] ABSTRACT

A seal for sealing the space between inner and outer ring members comprising a sealing ring and a retaining element engaging in a recess in the outer ring with axial pretension and means mounting the sealing ring and retaining member in a manner for preventing relative movement in the radial direction between the sealing ring and the retaining member.

11 Claims, 3 Drawing Sheets

SEAL FOR BEARINGS AND SYSTEM FOR SEALING BEARINGS

FIELD OF THE INVENTION

The present invention relates to seals for bearings and particularly to a new system for sealing bearings particularly ball and socket joints with a split bearing ring.

BACKGROUND OF THE INVENTION

Seals of the type to which the present invention relate generally consists of a sealing ring and retaining part which fits with axial pretension in a recess in the outer ring and wherein the sealing ring has a sealing lip which rests against, for example, the inner ring.

A seal of this general description is shown in French Pat. No. 978,288. In accordance with the seal shown in the French Patent, a sealing disk made of an elastic material is held in a toothed sheet metal washer in a ring-shaped groove in the outer ring. The elastic material of the sealing disk is pressed radially outwardly against the outer ring. This type of seal has certain disadvantages and drawbacks. For example, in the case of split bearing rings, the outer ring is expanded by the radially outwardly pressing lock washer. Additionally, the rubber seal can shift under severe dynamic loads which means that the seal is easily destroyed and the bearing becomes stiff.

SUMMARY OF THE INVENTION

With the foregoing in mind, it is an object of the present invention to provide a seal and a system for sealing bearings which does not cause a split bearing ring to expand and which also prevents radial displacement of the elastic sealing ring even under severe dynamic loading. To this end, and in accordance with the present invention, a retaining ring is fitted with radial play or with axial and/or axial pretension on the surface of a recess in the outer ring and means are provided on the retaining ring preventing relative movement in the radial direction between the sealing ring and the retainer. This arrangement ensures a good seal between the bearing rings and provides a seal which is relatively easy and economical to manufacture and assemble.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENTS

Figure 1:
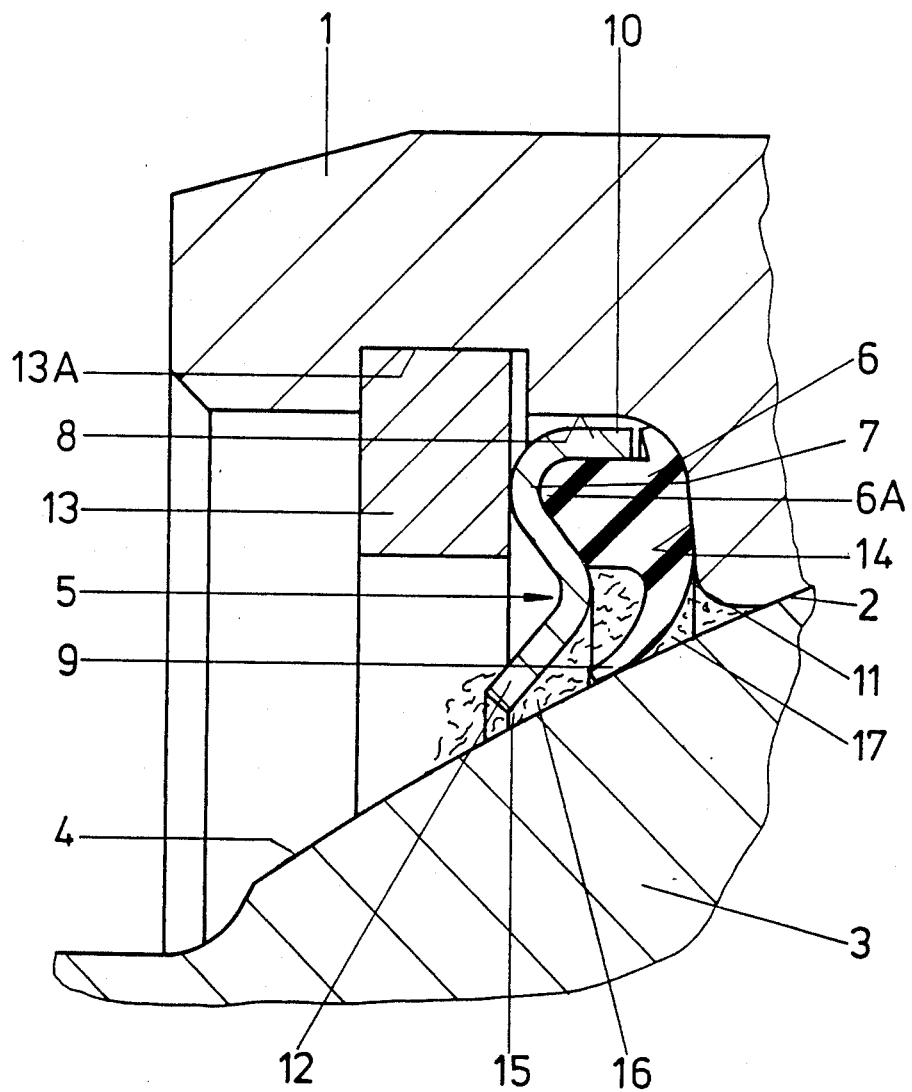
FIG. 1 is an enlarged fragmentary sectional view of a seal for a ball and socket joint in accordance with the present invention.

Referring now to the drawings and particularly to FIG. 1 thereof, there is shown a ball and socket joint incorporating a seal in accordance with the present invention. As illustrated therein, the ball and socket joint assembly has a split outer ring 1 having a spherical bore 2 and an inner ring 3 having a correspondingly shaped lateral surface 4 to allow for free pivotal movement of the rings relative to one another. A seal, generally designated by the numeral 5, is provided which comprises a sealing ring 6 made of an elastic material and a retaining member 7 which are fitted into a milled-out area in the outer ring 1, generally designated by numeral 8. As shown in FIG. 1, sealing ring 6 includes a circumferentially extending sealing lip 9 adapted to engage the lateral surface 4 of the inner ring and is mounted in such a manner such that it is bent outwardly and rests with pretension against this lateral surface 4. The sealing ring is supported in place by retainer 7 which is of S-shaped cross section having an outer edge bent axially inwardly to engage with a predetermined amount of play in the groove 8. The S-shaped configuration of retainer 7 defines an indented area or circumferentially extending pocket within which the bead 6a of sealing ring 6 nests. As illustrated, the inner edge 12 of the retainer 7 is bent outwardly and extends downwardly to a point closely adjacent lateral surface 4 of the inner ring 3.

The seal 5 consisting of the sealing ring 6 and retainer 7 is held in place in the manner illustrated by a lock washer 13 which engages in a ring-shaped groove 13a in the outer ring 1 and which, as illustrated, compresses the sealing ring 6 so that the bead 6a nests in the pocket 11 and presses the sealing ring 6 against the radial surface 14 of groove 8. By this arrangement, any radially outwardly pressing forces resists displacement of the outer ring 1 which is split on one side and, therefore, no gap can develop at the point of the split. The outwardly bent inner edge 12 of retainer 7 forms with the lateral surface 4 of the inner ring 3 a wedge-shaped channel 15 which has a self-cleaning effect. Further, spaces 16 and 17 defined by the retainer 7 and sealing ring 6 and between sealing ring 6 and bearing rings 1 and 3 are filled with a lubricant such as grease which further improves the sealing capability. By this arrangement, coarse particulate matter, such as dirt, is directed away through gap 15 between retainer 7 and inner ring 3. Retainer 7 also serves as a mechanical barrier protecting sealing ring 6 against damage.

Figure 2:
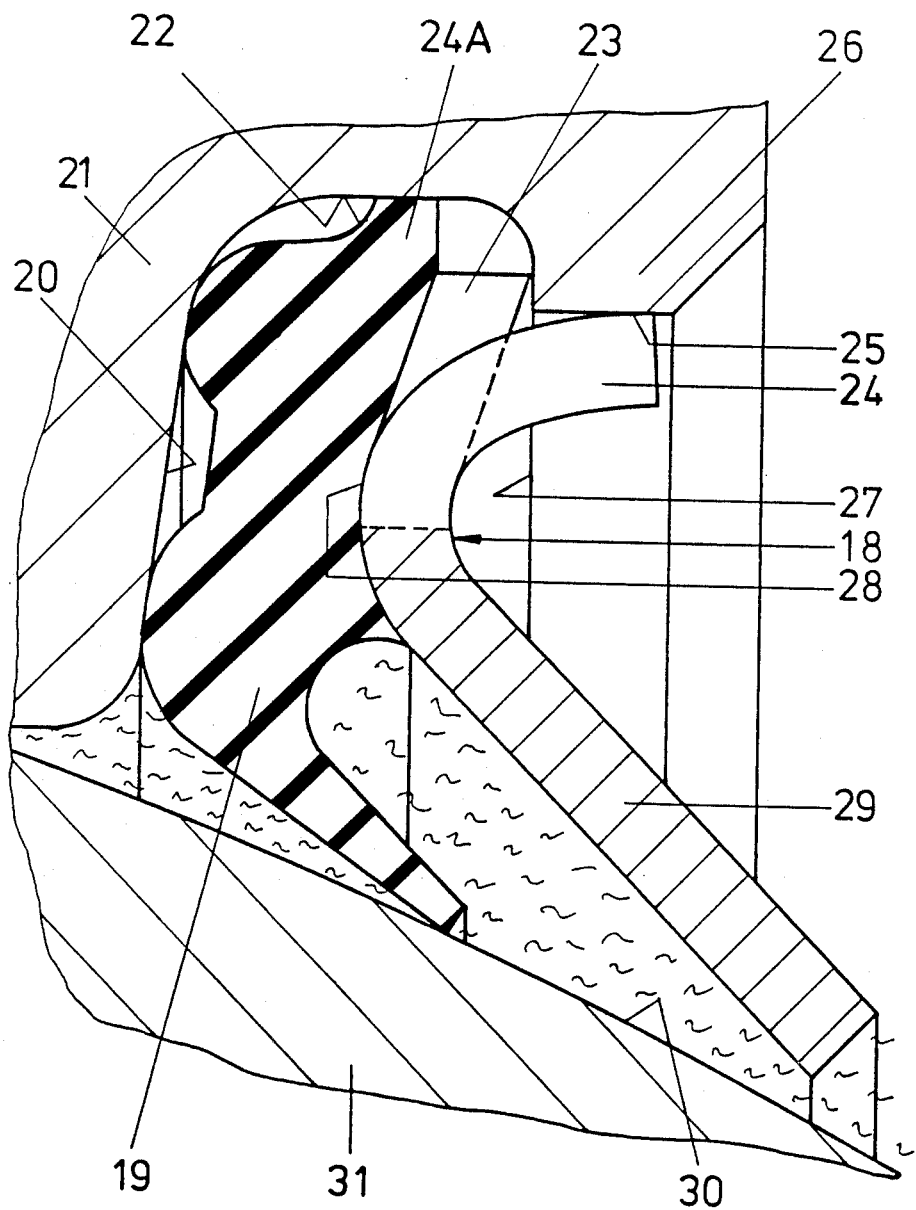
FIGS. 2 and 3 show modified embodiments of a seal for a ball and socket joint in accordance with the present invention.
Figure 3:
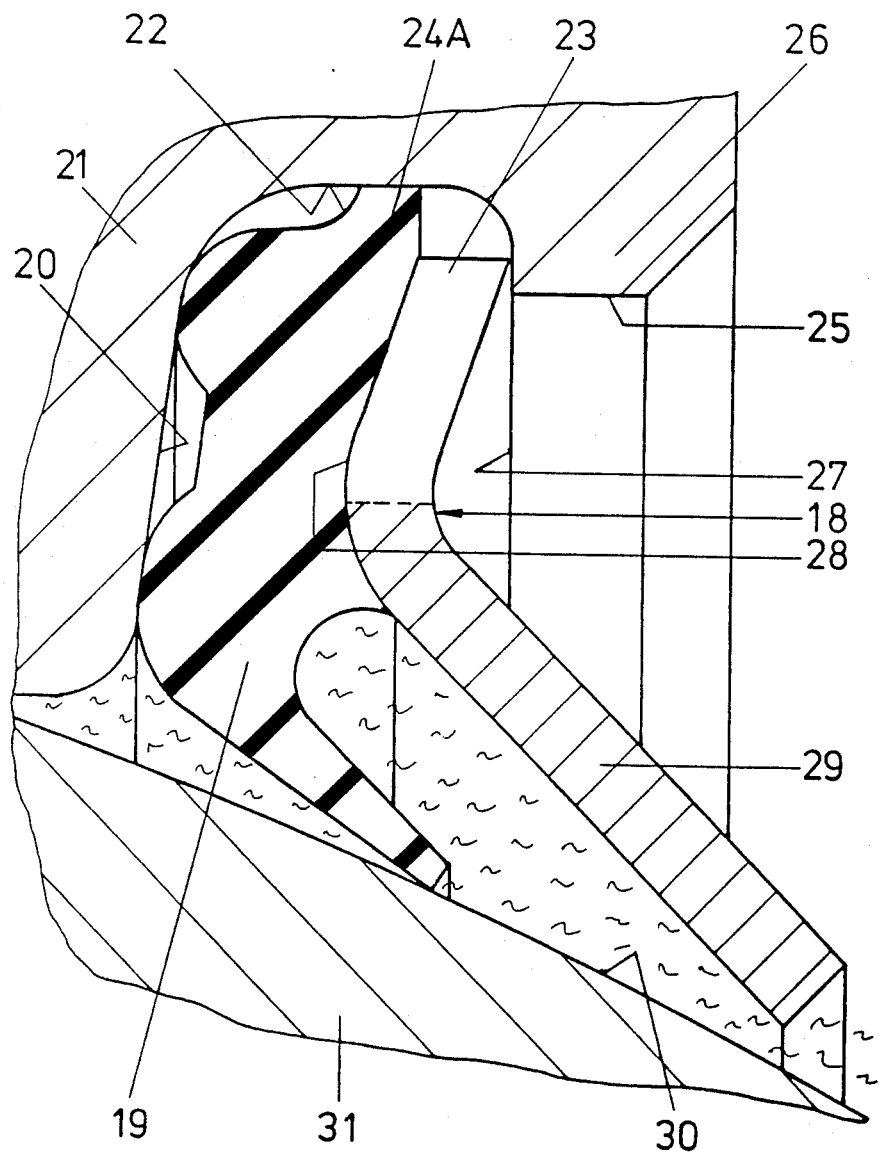

FIGS. 2 and 3 illustrate additional embodiments of seals in accordance with the present invention. The seals shown in these figures consists essentially of a retainer 18 of sheet metal and a sealing ring 19 made of a flexible, resilient, elastic material such as rubber. The sealing ring 19 is pressed by retainer 18 as in the previously described embodiment with a predetermined axial pretension against a radial surface 20 of a recess 22 provided in the bore of the outer ring 21 and which is, thus, held in place in the radial direction on the outer ring 21. In the present instance, the retainer 18 has an L-shaped cross section and has an array of teeth formed in its outer peripheral edge comprising in the present instance a series of retaining teeth 23 which engage between the sealing ring 19 and the radial face of a radially inwardly directed flange 26 in the bore of the outer ring 21 and a series of alternating centering teeth 24 which, as illustrated in FIG. 2, engage the bore surface 25 of the flange 26. Note that the retaining teeth 23 are slanted at a smaller angle to the bearing axis than the centering teeth 24 and have a shorter extended length.

Consider now installation of the seal described above. First, the sealing ring 19 is inserted into the recess 22 in the outer ring where it is supported on the bore surface of the recess 22 by a circumferential projection which may be in the nature of a continuous lip or flange or circumferentially spaced radial projections 24a distributed around the circumference thereof. The retainer 18 is then pressed into the recess from the open side. During this process, the teeth engage the beveled surface of flange 26 and are flexed inwardly so they can clear the bore 25 of flange 26. By reason of the differing length of the teeth, the retaining teeth 23 then spring outwardly when they clear the bore surface 25 and abut with axial pretension against radial surface 27 of flange 26. In this manner, the bowed or bent section 28 of retainer 18 is pressed into the sealing ring 19 thereby to tighten the sealing ring 19 in the axial direction against the outer ring 21 and hold it in place. The seal also provides radial centering by virtue of the centering teeth 24 which rests with play or with slight pretension against bore surface 25 of flange 26. Note that the inner edge 29 of retainer 18 is bent outwardly in much the same fashion as the inner edge 12 of the previously described embodiment and is spaced closely adjacent the lateral surface 30 of inner ring 31.

The embodiment described in FIG. 3 is identical to the embodiment illustrated in FIG. 2, except that retainer is only provided with the retaining teeth.

Even though particular embodiments of the present invention have been illustrated and described herein, it is not intended to limit the invention and changes and modifications may be made therein within the scope of the following claims.

What is claimed is:

1. In combination, inner and outer ring members and a seal for sealing the space between the ring members comprising a sealing ring made of an elastic material and a retaining member and means mounting the seal with a predetermined axial pretension to firmly seat the seal to one of said ring members in a manner to resist radial movement of the sealing ring and retaining member.

2. The combination claimed in claim 1, wherein the retaining member has an indented opening (11) adjacent its outer edge to receive the circumferential bead (6a) of the sealing ring (6).

3. The combination claimed in claim 1, wherein the retaining member (7) has an S-shaped cross section and wherein the outer edge (10) is bent inward axially and wherein play is provided between the retaining member (7) and the circumferential surface of a recess (8) in one of the ring members.

4. The combination claimed in claim 1, wherein said retaining member is of L-shaped cross section.

5. A seal assembly according to claim 1, wherein said retaining member (18) is provided on its outer edge with centering teeth (24).

6. A seal assembly according to claim 1, wherein said retaining member 18 is provided on its outer edge with retaining teeth (23).

7. A seal assembly according to claim 1, wherein said retaining member (18) is provided on its outer edge with retaining teeth (23) and centering teeth (24).

8. A seal assembly according to claim 7, wherein said retaining teeth (23) slant at a predetermined angle relative to the bearing axis smaller than the slant angle of said centering teeth (24) and wherein said retaining teeth (23) are of a shorter extended length than the centering teeth (24).

9. A seal assembly according to claim 6, wherein said sealing ring (19) in the installed state rests tightly against the bent section (28) of the retaining member (18), and wherein the retaining teeth (23) rest against a radial surface (27) of a flange (26).

10. A seal assembly according to claim 8, wherein said centering teeth (24) rest with play or with a small amount of radial pretension against the bore surface (25) of the flange (26).

11. The combination claimed to claim 1, wherein the sealing ring (19) is provided on its lateral surface with a plurality of radial projections (24a) distributed around the circumference, which projections rest against the bore surface of the recess (22).

* * * * *